Jan. 19, 1954   J. H. SCHMID   2,666,211
SEALED CONNECTION FOR WALL CLOSET FITTINGS
Filed Aug. 5, 1950
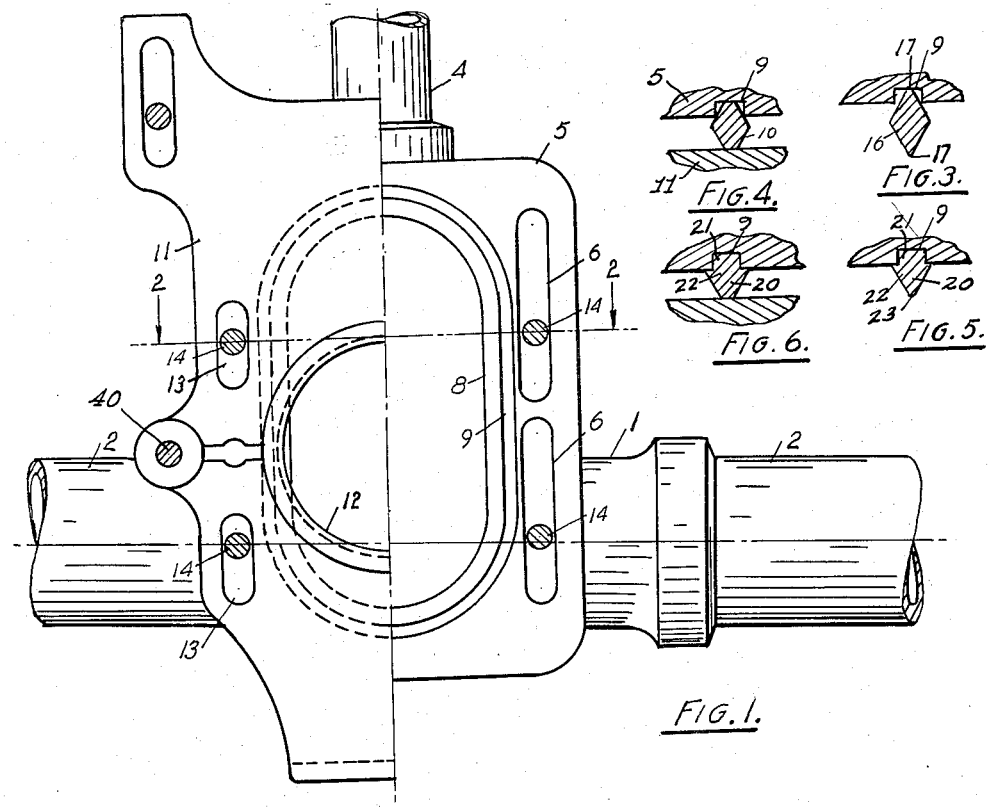
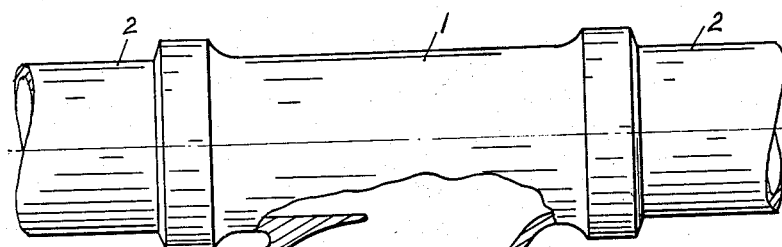
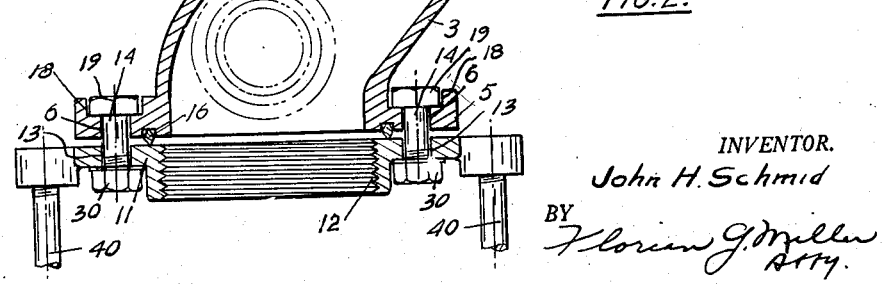
INVENTOR.
John H. Schmid Patented Jan. 19, 1954

2,666,211

UNITED STATES PATENT OFFICE 2,666,211

SEALED CONNECTION FOR WALL CLOSET FITTINGS

John H. Schmid, Erie, Pa., assignor to J. A. Zurn Mfg. Co., Erie, Pa., a corporation of Pennsylvania Application August 5, 1950, Serial No. 177,889

1 Claim. (Cl. 4—252)

This invention relates generally to sealing members and more particularly to lead and like gaskets for use in conjunction with a vertically adjustable wall closet fitting.

Vertically adjustable wall closet fittings for supporting wall type water closets utilize a gasket seal between the fitting and adjustable face plate which has heretofore been unsatisfactory. The gasket is often compressed non-uniformly, resulting in leakage. The graphited asbestos previously used in wall closet fittings quickly deteriorates and causes leakage. Present gaskets do not penetrate the surface pores and other irregularities in the castings forming the face of the fitting and the adjustable face plate connected thereto, resulting in seepage of water from the connecting joint in connection with the fitting. It has been found that round gaskets and rectangular shaped gaskets do not penetrate the pores in the castings thereby permitting seepage of water. It has been particularly difficult to efficiently and effectively seal the joint between face plates on vertically adjustable type wall closet fittings because of the elongated opening in one of the face plates of the fitting.

It is, accordingly, an object of my invention to overcome the above and other defects in seals for use with wall closet fittings and it is more particularly an object of my invention to provide a gasket for use in conjunction with a wall closet fitting which is simple in construction, economical in cost, economical in manufacture, easy to assemble, and efficient in operation.

Another object of my invention is to provide for use in conjunction with a wall closet fitting a gasket which has sharp edge portions which penetrate the pits, surface pores, and other irregularities in the castings to provide a perfect seal.

Another object of my invention is to provide a groove in a wall closet fitting for disposing a diamond shaped gasket whereby there may be three points of sealing contact between the gasket and the bottom and sides of the groove.

Another object of my invention is to provide a gasket for use in conjunction with a wall closet fitting which has a high unit line pressure.

Other objects of my invention will become evident from the following detailed description, taken in conjunction with the accompanying drawings, in which Fig. 1 is a side elevational view broken away on the center line of my novel wall closet fitting with my novel gasket disposed between it and a flange for securing and mounting a water closet;

Fig. 2 is a plan view of my novel wall closet fitting and gasket used in conjunction therewith, parts thereof broken away for better illustration;

Fig. 3 is a fragmentary cross sectional view of my novel gasket before initial pressure is placed on the flanges of the wall closet fitting and water closet;

Fig. 4 is a fragmentary sectional view of the gasket shown in Fig. 3 after the gasket is initially set up;

Fig. 5 is a fragmentary sectional view of a modified form of gasket for use with my novel wall closet fitting; and Fig. 6 is a fragmentary sectional view of the gasket shown in Fig. 5 after it is initially set up between the flanges of the wall closet fitting and water closet, respectively.

Referring now to the drawings, I show in Figs. 1 to 4 inclusive a wall closet fitting 1 connected to pipes 2 and having a laterally arcuately outwardly extending branch 3 with an upwardly extending vent pipe 4. The branch 3 of the fitting 1 has an outwardly directed flange 5 with vertically extending spaced slots 6 on opposite sides of an elongated opening 8. A groove 9 rectangular in cross section, in the face of the flange 5, is disposed in spaced relation with the outer periphery of the opening 8 in the branch 3 of the fitting 1. A vertically adjustable carrier face plate 11 with an internally threaded central aperture 12 has parallel spaced, vertically extending slots 13 in registration with slots 6 in the flange 5. The slots 6 in flange 5 are much longer than the slots 13 in face plate 11 so that the aperture 12 in the face plate 11 may be adjusted vertically to different positions in relation to the elongated opening 8 in fitting 1. A conventional water closet is secured to the face plate 11 through a coupling (not shown) engaging threaded aperture 12 and bolts 40. Bolts 14 extend through the slots 6 and 13, the ends of the bolts 14 being threadably engaged by nuts 30 to secure the face plate 11 into the face of the flange 5 of the branch 3 of the fitting 1 in a predetermined vertical position. A diamond shaped gasket 16 is disposed in the groove 9 in the face of the flange 5 of the fitting 1, the opposite side thereof being engaged by the face of the face plate 11 as shown in Fig. 2. Both the face of the flange 5 of the fitting 1 and the opposing face of the face plate 11 are normally unmachined cast iron members which have pits, surface pores, and many other surface irregularities. It has been found necessary, therefore, to provide a comparatively sharp edged gasket so that the sharp edge may penetrate the pits, indentations, surface pores, and other surface irregularities in the faces of the cast iron members. A gasket must, therefore, be provided with a high unit line pressure. I have found that a uniform, free flowing, non-corroding grade chemical lead gasket is the most suitable for my purposes.

My novel gasket 16 has a cross section which is a plane figure formed by four equal straight lines between two acute and two obtuse angles. It may be a rhombus or lozenge shaped. A rhombus is an equilateral parallelogram having its angles oblique. The sides of my novel gasket forming acute angles and converging to a comparatively sharp edge are the ones which extend into the groove 9 on the flange 5 of the fitting 1 and engage the face of the face plate 11. The major width of the gasket 16 is defined by the edges 17 thereof. Straight grooves 18 in registration with the slots 6 in the flange 5 are formed on the back of opposite sides of the flange 5 to nest the heads 19 of the bolts 14 to prevent them from turning.

In the assembly of my novel sealed connection between a wall closet fitting and the adjustable carrier face plate 11 for carrying a water closet, one edge 17 of the edges defining the major width of the diamond shaped gasket 16 is disposed in the groove 9 in the flange 5 of the fitting 1 as shown in Fig. 3. The face of the face plate 11 is then disposed adjacent the face of the flange 5 of the fitting 1 in engagement with the edge 17 of the gasket 16 opposite to the one in the groove 9. The longitudinally extending spaced slots 6 and 13 are disposed in registered relationship, the bolts 14 are extended through the slots 6 and 13 and they are engaged by nuts 30 when the face plate 11 is disposed in its correct vertical position. The bolt and nut assemblies are initially taken up to apply pressure on the flange 5 and face plate 11 to initially flatten the comparatively sharp edges 17 of the gasket 16. Even upon initial tension of the bolt and nut assemblies, the sharp edges 17 of the gasket 16 penetrate the pits, indentations, and other surface irregularities in the faces of the flange 5 of the fitting 1 and the face plate 11, respectively, to seal the joint between the two members. As more tension is placed on the bolt and nut assemblies, the sharp edges 17 of the gasket 16 flatten out as shown in Fig. 4 and the two sides of the gasket 16 in the groove 9 sealingly engage the outer edges of the groove 9, thereby providing sealing engagement at three points in the groove 9. The relatively greater strength of the gasket 16 approaching the major width thereof from the sharp edges 17 prevents deformation of the main body of the gasket 16 under compression stress and so holds the face plates apart until the sharp edges 17 have deformed and flowed into all surface irregularities in the face plates. Further stress and deformation result in additional sealing contact at the corners of the groove 9. There is no tendency to cause uneven relative movement between the faces of the flange 5 of the fitting 1 and face plate 11, respectively, inasmuch as the bolt and nut assemblies are taken up evenly all around.

I preferably slightly blunt the sharp edges 17 of the gasket 16 before installation thereof.

In Figs. 5 and 6, I show a modified cross section for my novel gasket. In this instance, one side 21 of my novel gasket 20 is rectangular in cross section to fit into the rectangular groove 9 in the face of the flange 5 of the fitting 1. The opposite side 22 of the gasket 20 converges to a point at 23 and is substantially the same as one side of the diamond shaped gasket shown in Figs. 3 and 4. The sealing action of the sharp edge of the gasket 20 shown in Figs. 5 and 6 on the face of the face plate 11 is the same as the sharp edge on one side of the diamond shaped gasket 16 shown in Figs. 3 and 4.

It will be evident from the foregoing description that I have provided a novel sealed connection between a wall closet fitting and an adjustable carrier face plate for carrying a water closet having a sealing gasket which penetrates the pits, indentations, and other irregularities in the opposing faces of the fitting and face plate, which seats in a groove in the face of the fitting so as to provide a three point sealing contact, which is extremely simple in construction, operation, and assembly, and which is efficient in operation.

Various changes may be made in the specific embodiment of my invention without departing from the spirit thereof or from the scope of the appended claim.

What I claim is:

In a water closet carrier, a hollow fitting having a hollow branch attached thereto, said branch hollow communicating with said fitting hollow and terminating in an elongated opening, a flat faced flange attached to the branch and disposed around the elongated opening, said flange having a groove in the face thereof, said groove being disposed around the elongated opening, a gasket diamond shaped in cross section for disposal in the groove, a flat faced water closet carrier having an opening therein, said carrier opening being adapted to communicate with the hollow branch, and means to secure the water closet carrier to the flange in adjusted relation thereto whereby the opening in the carrier communicates with the hollow in the branch in a plurality of adjusted positions of the carrier, the groove in said flange being rectangular in cross section and one sharp edge of the diamond engaging the bottom of the groove and the outside corners of the groove engaging two sides of said diamond shaped gasket and the diamond shaped gasket adapted to sealingly engage the flat faced flange and the flat face of the water closet carrier in any of the adjusted positions of the carrier.

JOHN H. SCHMID.

References Cited in the file of this patent

UNITED STATES PATENTS

| Number | Name | Date |
|--------|------|------|
| 812,543 | Buchanan, Jr. | Feb. 13, 1906 |
| 1,019,766 | Cronk | Mar. 12, 1912 |
| 1,035,457 | Madden | Aug. 13, 1912 |
| 1,363,027 | Watrous | Dec. 21, 1920 |
| 1,410,526 | Bennett | Mar. 21, 1922 |
| 2,295,416 | Madison | Sept. 8, 1942 |